US010257299B2

United States Patent
Sadanandan et al.

(10) Patent No.: US 10,257,299 B2
(45) Date of Patent: Apr. 9, 2019

(54) USER SUBSCRIPTION TO CONTENT

(71) Applicant: Oath Inc., New York, NY (US)

(72) Inventors: Suhas Sadanandan, Pleasanton, CA (US); Kevin Christopher Day, San Jose, CA (US); David Anthony LeRoy, Sunnyvale, CA (US)

(73) Assignee: Oath Inc., New York, NY (US)

( * ) Notice: Subject to any disclaimer, the term of this patent is extended or adjusted under 35 U.S.C. 154(b) by 160 days.

(21) Appl. No.: 15/212,383

(22) Filed: Jul. 18, 2016

(65) Prior Publication Data

US 2018/0020067 A1 Jan. 18, 2018

(51) Int. Cl.
*H04L 29/08* (2006.01)
*H04L 29/06* (2006.01)
*H04L 12/58* (2006.01)

(52) U.S. Cl.
CPC .............. *H04L 67/26* (2013.01); *H04L 51/18* (2013.01); *H04L 67/22* (2013.01); *H04L 67/306* (2013.01); *H04L 67/42* (2013.01)

(58) Field of Classification Search
CPC ......... H04L 67/26; H04L 67/22; H04L 67/30; H04L 51/18; G06F 3/04
USPC ....................................................... 709/206
See application file for complete search history.

(56) References Cited

U.S. PATENT DOCUMENTS

| 2014/0006951 A1* | 1/2014 | Hunter ................... | H04H 60/31 715/719 |
| 2015/0324858 A1* | 11/2015 | DeMattei ................ | H04L 51/08 705/14.64 |
| 2016/0014060 A1* | 1/2016 | Vasudevan .............. | H04L 51/14 709/206 |

* cited by examiner

*Primary Examiner* — Glenford J Madamba
(74) *Attorney, Agent, or Firm* — Cooper Legal Group, LLC

(57) ABSTRACT

One or more computing devices, systems, and/or methods for facilitating user subscription to content from a content provider are provided. For example, a message interface provides access to messages associated with a user message address of a user. A content recommendation to subscribe to content of a content provider is generated and populated within the message interface (e.g., a recommendation to subscribe to a gardening newsletter). Responsive to the user interacting with the content recommendation, a subscribe option is displayed through the message interface. The user can use the subscribe option to quickly and efficiently create a user subscription to the content without transitioning away from the message interface. Information used to create the user subscription can be prefilled in order to reduce the amount of user actions needed for creating the user subscription.

20 Claims, 14 Drawing Sheets

USER SUBSCRIPTION TO CONTENT

BACKGROUND

A content provider may provide users with access to content, such as newsletters, photos, videos, promotions, and/or a variety of other content that may be relevant and/or interesting to such users. Because the content provider may be unaware of what types of content may be relevant to a particular user and/or how to deliver such content to the user (e.g., the content provider may be unaware of an email address of the user), the user may need to first make prior initial contact with the content provider before the content provider can inquire with the user as to whether the user desires to sign up for a content subscription to content from the content provider (e.g., sign up for running emails through a running website). Thus, the content provider must drive users to a landing webpage through which the users can sign up for access to content. For example, the user may be redirected from a news website to the running website such as in response to clicking a recommendation at the news website for the running website, and must fill out an email address and/or other personal information in order to sign up for the running emails. Unfortunately, transitioning the user away from a current experience (e.g., the user reading a news article from the news website) and requiring that the user spend time manually inputting personal information may be disruptive to the user experience, expose the user to privacy concerns of submitting personal information, and/or waste computing resources and network bandwidth in transitioning the user between user interfaces (e.g., transitioning from the news website to the running website, and then back to the news website to finish reading the news article).

SUMMARY

In accordance with the present disclosure, one or more computing devices and/or methods for facilitating user subscription to content in a non-disruptive manner are provided. A user interface, such as a message interface used to provide access to messages associated with a user message address of a user (e.g., an email app or website, a social network message application or website, etc.) or any other user interface (e.g., a weather app, a news website, etc.), may be displayed to the user. A content recommendation may be generated for subscribing to content of a content provider. For example, a user profile (e.g., the user may create a user profile indicating an interest in sports), a browsing history, a user location (e.g., global positioning system (GPS) data, social network location check-in data, etc.), message content (e.g., the user may have received an email regarding soccer practice), social network content (e.g., the user may create a social network post asking friends about their favorite soccer shoes, the user may post a soccer team photo, etc.), and/or other users signals are evaluated to identify a content preference of the user that may be used to select the content and the content provider for generating the content recommendation (e.g., the content recommendation may suggest that the user sign up for soccer news emails and photos from a soccer news provider).

The user interface, such as the message interface, may be populated with the content recommendation. In an example where the user interface comprises an email inbox user interface having a plurality of message slots into which emails can be inserted for display to the user, the content recommendation may be inserted into a message slot (e.g., a first message slot that is displayed more prominently, such as at a top of the email inbox user interface, than other message slots). Response to the user interacting with the content recommendation such as selecting the content recommendation, a subscribe option may be displayed through the message interface. In an example, the subscribe option may be displayed through a pop-up window. In another example, the subscribe option may be displayed within a message reader interface used to display messages in a readable format. The subscribe option may provide a terms of service of the content provider, a description of the content, prefilled information to selectively provide to the content provider (e.g., a zip code, email address, and/or other information of the user may be identified and prefilled into fields so that the user can selectively approve which information is sent to the content provider), and/or fields through which the user may specify information (e.g., optionally requested info) requested by the content provider. In an example, the subscribe option may provide the user with the ability to accept the creation of a user subscription to the content through minimal user input such as single user input without having to manually fill in personal information (e.g., an email address and/or other requested information may be prefilled from information known about the user) and/or without transitioning away from the user interface that would otherwise disrupt the user's current experience with the user interface. Accordingly, responsive to the user accepting the subscribe option, creation of the user subscription may be facilitated.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
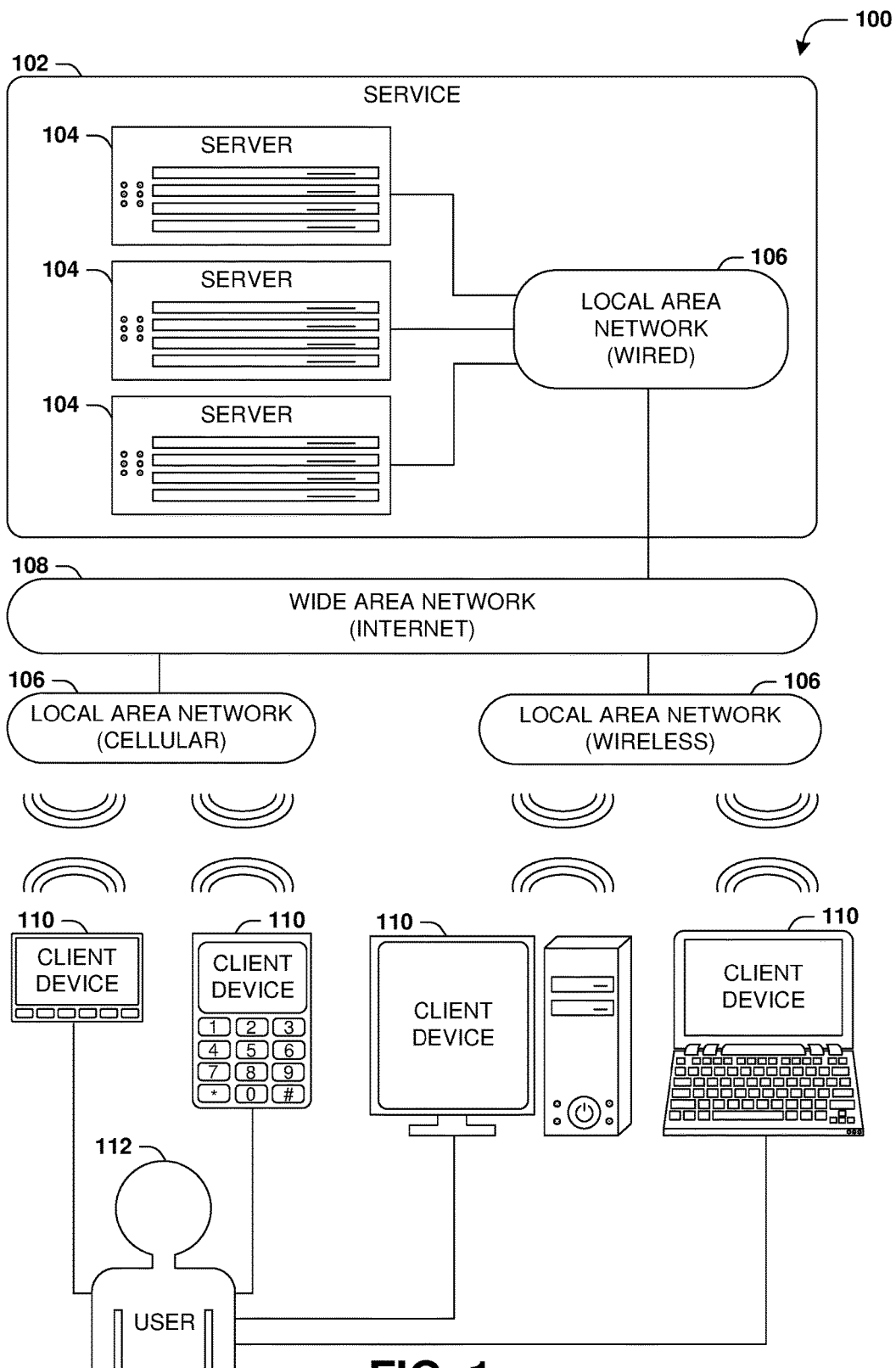
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
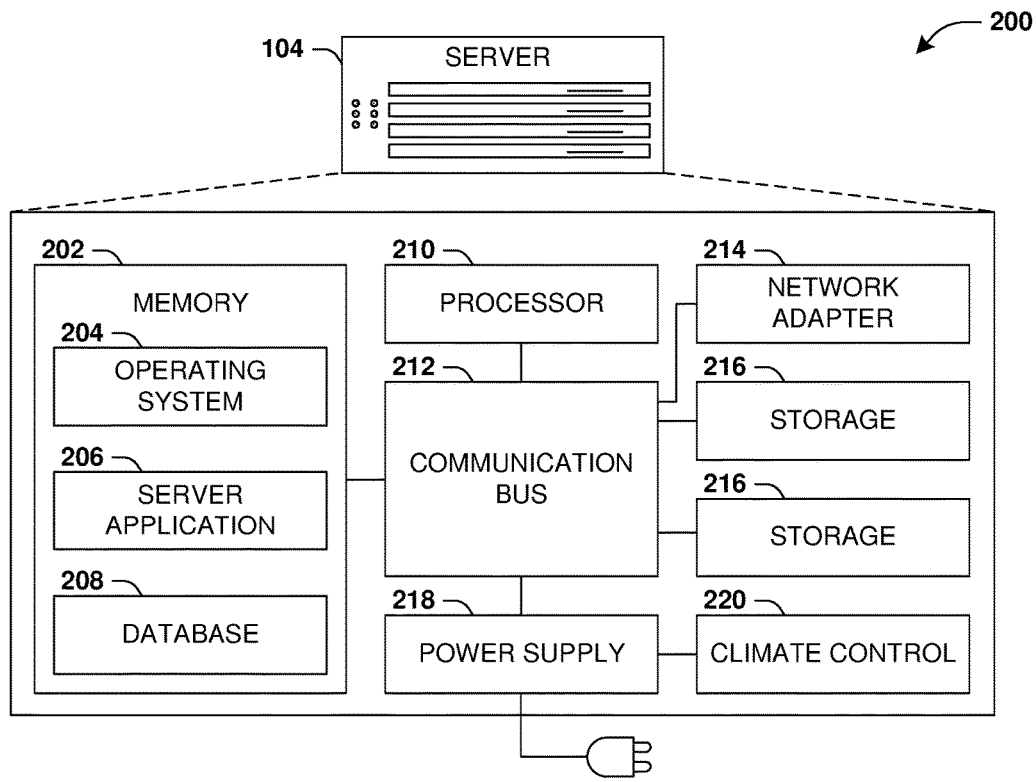
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
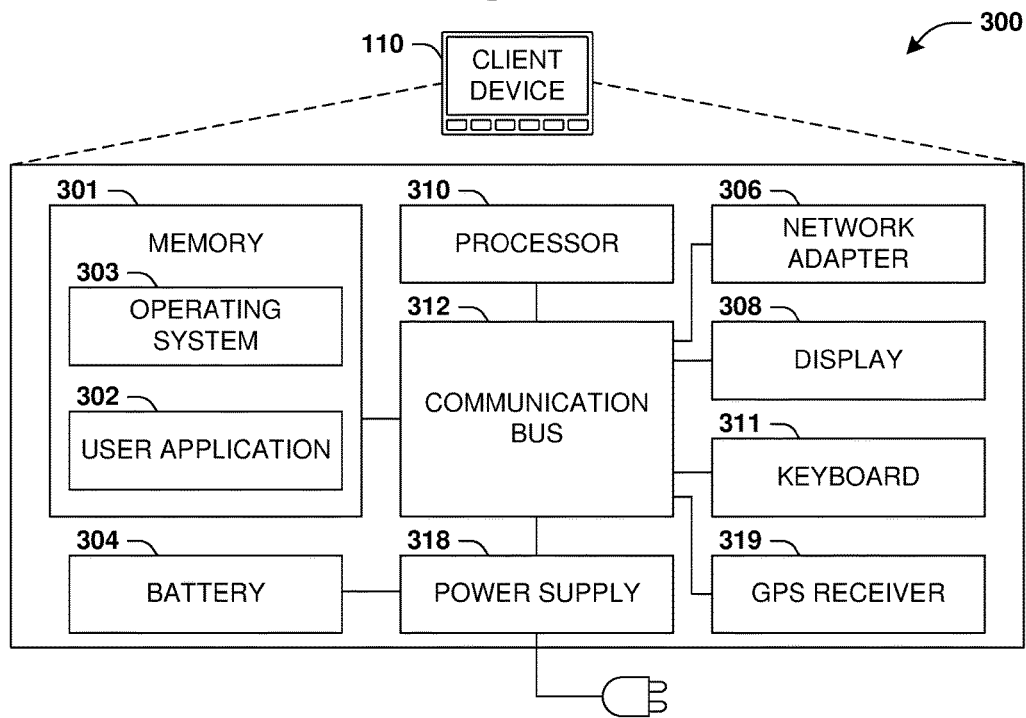
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for facilitating subscription to content from a content provider are provided. For example, the content provider may be unable to identify users that may be interested in content from the content provider unless such users first access the content provider, such as visiting a landing webpage of the content provider through which the user may sign up for the content (e.g., a food website may not have knowledge that a particular user may be interested in newsletters with cooking tips and food photos unless the user first accesses the food website to sign up for such newsletters). Accordingly, various applications and websites may redirect users to the food website to sign up for the newsletters. Unfortunately, redirecting users away from a current experience (e.g., a user may be researching gardening tips through a gardening website, but may be transitioned away from the gardening website to the food website) may be disruptive to the user and waste computing resources and bandwidth to load the food website and/or for the user to transition back to the gardening website to continue researching gardening tips. The user may waste time performing manual actions, such as filling out a subscription form, in order to sign up for the newsletters. Also, the user may be exposed to privacy and/or security concerns from being redirected from the gardening website to a landing page of the cooking website for subscribing to the newsletter because the landing page may require personal information such as an email address, home address, phone number, etc. from the user (e.g., the user may not yet trust or be familiar with the cooking website).

Accordingly, as provided herein, a content recommendation, which may be tailored to interests of a user, may be displayed through a user interface, such as a message interface, so that the user may efficiently subscribe to content of a content provider through a subscribe option displayed through the user interface without transitioning away from the user interface (e.g., without transitioning the user away from the message interface to a landing page of the content provider that requires the user to perform manual user actions to fill out forms, which may request personally identifiable information that the user may rather not provide). The user's experience is improved because the user may subscribe to the content without being disruptively transitioned way from the current experience of the user interface (e.g., reading emails). Because the user may subscribe to the content through the message interface without being transitioned to a separate website such as the landing page of the content provider, computing resources and/or network bandwidth, otherwise used to redirect the user to the landing page and/or used by the user to transition back to the message interface, are reduced. In an example, the subscribe option may be generated dynamically (e.g., on the fly) at a client device using client resources (e.g., processer, memory, and network bandwidth used to execute subscribe option generation functionality included within executable code of the message interface), which reduces storage resources otherwise used to save predefined templates used to generate subscription options and reduces network bandwidth otherwise used to retrieve such predefined templates (e.g., a message server, hosting the message interface, may otherwise have to store hundreds of thousands of predefined templates for each individual content provider).

In an example, user configuration of the message interface (e.g., an email address of the user, a zip code of the user, etc.) may be evaluated to identify values for information requested by the content provider in order to create a user subscription to the content. The values may be prefilled into fields of the subscribe option, which may reduce the number of manual user actions required for providing information needed to create the user subscription. For example, the user can create the user subscription with a minimal user actions (e.g., one click to subscription) used to accept the creation of the user subscription, thus improving performance and reducing user frustration and time otherwise spent manually entering information. Because user preferences (e.g., the user may specify an interest in cooking) may be used to generate the content recommendation, the content recommendation is tailored to the user and provides a more relevant and interesting recommendation, which reduces user annoyance, informs the user of available content that the user may otherwise be unaware, and reduces computing resources and network bandwidth otherwise wasted by the user in attempting to find such relevant or interesting content.

Security is improved because the content subscription can be created by providing the content provider with little to no personally identifying information and merely content providers that are trusted are recommended through content recommendations provided through the message interface (e.g., as opposed to the user being transitioned to an unfamiliar landing page requiring input of various personally identifying information). In an example, a message provider of the message interface acts as an intermediary through which user subscriptions are created and content messages of content for the user are delivered. For example, the message provider merely provides a placeholder identifier (ex: a disposable email address), mapped to an actual email address of the user, to the content provider so that the content provider does not have access to the actual email address of the user, which improves user privacy and security. Thus, when a content message, specifying the placeholder identifier as a destination target, is received from the content provider for the user, the message provider uses the mapping to determine that the placeholder identifier is mapped to the actual email address of the user. In this way, the message provider of the message interface will deliver the content message to the user. The message provider may allow the user to efficiently revoke the mapping so that the user still receives messages directed to the actual email address but not to the placeholder identifier, thus providing a way to safely unsubscribe to content.

It may be appreciated that the user may take affirmative action, such as providing opt-in consent, to allow access to and/or use of user configuration of the message interface, message content, social network content, a user profile, a user preference, a current location, and/or any other type of information, such as for the purpose of generating content recommendations and/or prefilling fields with information requested by content providers for creating user subscriptions (e.g., where the user responds to a prompt regarding the collection and/or use of such information). The user may also opt-out from providing access to such information or portions thereof (e.g., access may be provided to merely social network check-in data and a social network profile, but not real-time GPS data or content within emails).

Figure 4:
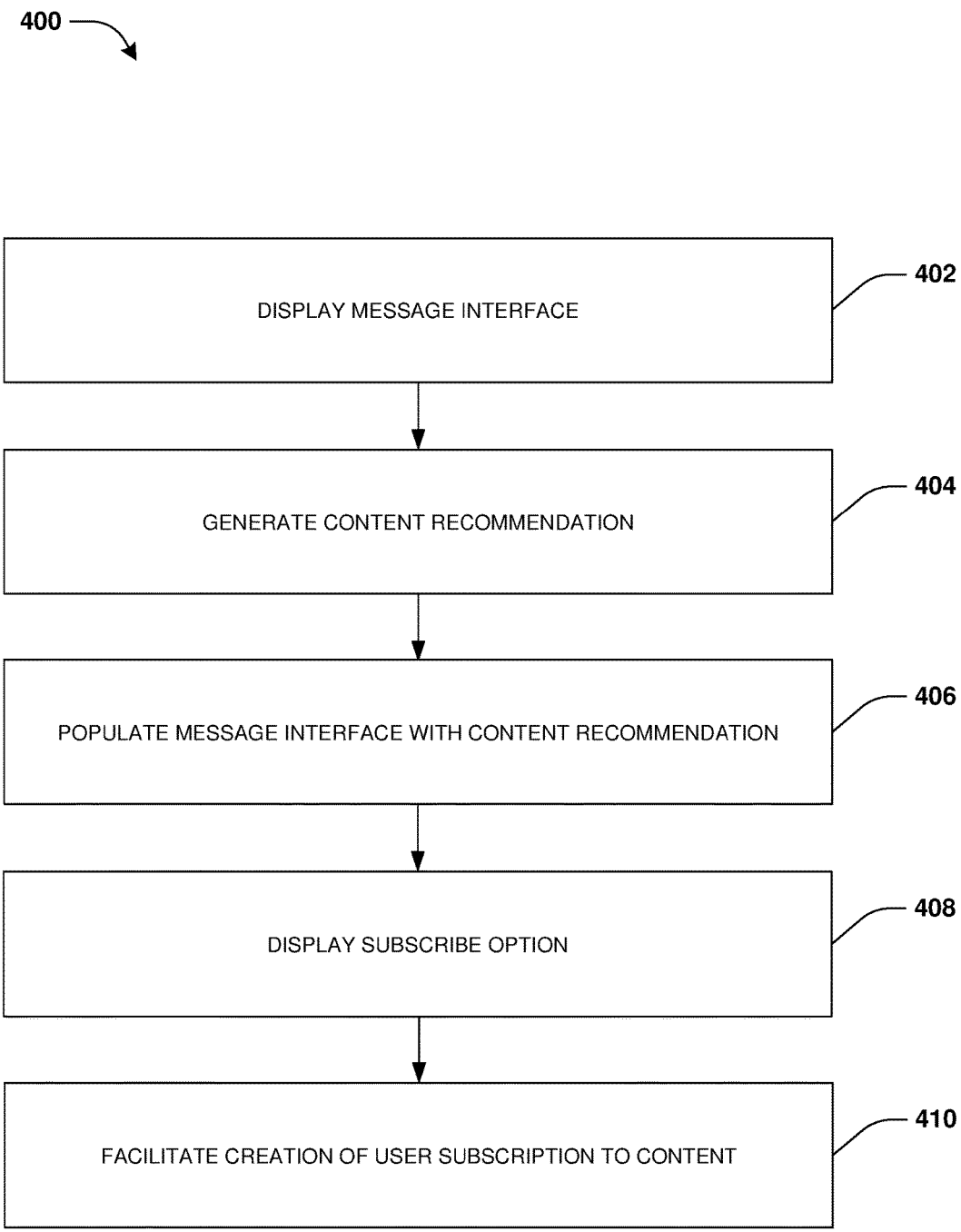
FIG. 4 is a flow chart illustrating an example method for facilitating subscription to content from a content provider.

An embodiment of facilitating subscription to content from a content provider is illustrated by an example method 400 of FIG. 4. In an example, a user may access a user interface (e.g., a weather website, a social network app, a game, an email interface, etc.). For example, a message interface, used to provide access to messages associated with a user message address of the user, may be displayed (e.g., the user may access an email interface that provides access to emails associated with an email address of the user), at 402.

At 404, a content recommendation, for subscribing to content of a content provider, may be generated. For example, a browser history (e.g., the user may have recently visited vacation websites), a user preference (e.g., the user may express an interest in warm weather, such as through a social network post, an email message, a vacation travel history, a user profile, etc.), the user profile, user configuration information (e.g., a zip code, a home address, a vacation home address, an email address, etc.), a user location (e.g., GPS data, social network check-in data, etc.), message content (e.g., the user may have sent an email expressing an interest in a beach vacation and a distaste for cold weather), social network content (e.g., a social network group joined by the user, content of a social network post, etc.), and/or other user signals may be evaluated (e.g., using image recognition functionality, text parsing functionality, feature extraction functionality, category determination functionality, etc.) to identify a content preference of the user, such as a content preference for beach vacation information. In this way, the content and the content provider may be selected for generating the content recommendation based upon the content preference so that the content recommendation may be more relevant and/or interesting to the user (e.g., as opposed to skiing information or other cold weather activities).

In an example, a message provider of the message interface (e.g., an email provider) may maintain a list of potential content providers that may be evaluated against approval criteria (e.g., approval based upon a quality of content, a target audience for the content such as a target age or other demographic compared to an age or other demographic of the user, a trust level, etc.) to determine approval ratings for potential content providers. For example, a first content provider may be selected over a second content provider for creating the content recommendation based upon the first content provider having a higher level of trust and providing higher quality content than the second content provider (e.g., more users may read and interact with newsletters from the first content provider than the second content provider; newsletters of the second content provider may tend to have profanity; and newsletters from the first content provider may have better grammar, higher resolution photos, etc.). In this way, if an approval rating of a potential content provider exceeds an approval threshold, the potential content provider may be identified as the content provider for the content recommendation. In this way, higher quality content recommendations may be provided to the user.

At 406, the message interface may be populated with the content recommendation. In an example, the message interface may comprise a plurality of message slots into which messages can be inserted (e.g., an email inbox may comprise a list interface into which emails are populated for user access). The content recommendation may be inserted into a message slot of the plurality of message slots so that the content recommendation may appear as another message accessible through the message interface even though the content recommendation is not a message directed to the user message address of the user (e.g., the message provider of the message interface may be capable of inserting the content recommendation into the message slot even though the content recommendation is not an email). In an example, the message slot may be assigned a display position rank that is greater than display position ranks assigned to other messages slots, and thus the content recommendation may be displayed more prominently (e.g., at a top of the email inbox) than messages.

Responsive to the user interacting with the content recommendation, a subscribe option may be displayed through the message interface, at 408. In an example, the subscribe option may be populated with a terms of service of the content provider. In another example, the subscribe option may comprise a subscribe action interface element that can be invoked by the user (e.g., a button user interface element with an on click property used to submit a user acceptance for creating a user subscription with the content provider). In another example, the subscribe option may comprise a field requesting information from the user for delivery to the content provider for creating the user subscription (e.g., the content provider may request a zip code of the user; the content provider may request a delivery method for delivering the content and thus the subscribe option may be populated with a content delivery option through which the user can specify a delivery method such as a social network message address, a mailing address, an email address, etc.). In another example, the subscribe option may comprise a prefilled field that is prefilled with a value identified by the message provider (e.g., the message provider may prefill a field, used to specify a delivery address for the content, with an email address of the user; the message provider may prefill the field with the user's home address, obtained from information extracted by the message provider from the user's previous shipping receipt emails sent through the message provider; etc.). In an example, the subscribe option may be displayed through a pop-up window of the message interface. In another example, the subscribe option may be displayed through a message reader interface used to display messages (e.g., the message reader interface may be generally configured to provide read access to an email body, an ability to reply to an email, an ability to forward an email, etc.) in a readable format through the message interface so that the content recommendation may appear as a message even though the content recommendation is not a message. In an example, a set of content may be available from the content provider (e.g., vacation images, beach vacation packages, skiing vacation information, weather information, etc.). The subscribe option may be populated with a selection interface through which the user can select one or more content for subscription (e.g., the user may subscribe to the vacation images and beach vacation packages, but not other content from the content provider).

In an example, client device resources of a client device hosting the message interface may be utilized to generate the subscribe option dynamically (e.g., on the fly) using client side functionality of the message interface (e.g., as opposed to accessing a remote server to retrieve such information). In this way, storage resources otherwise used (e.g., by the remote server such as the message provider of the message interface) to store predefined templates for creating subscribe options is reduced and network bandwidth otherwise used by the client device to retrieve such predefined templates is reduced.

In another example, a predefined template repository of predefined templates, maintained by the message provider, may be queried to identify a predefined template of the content provider. The predefined template may describe the content, the content provider, user information to request from the user, and/or any other information. For example, the predefined template may be evaluated to identify first user information to request. A field, requesting the first user information, may be created within the subscribe option (e.g., a phone number field). Responsive to the user inputting a value into the field and accepting the subscribe option, the value may be sent to the content provider. To improve security and privacy, the field may be optional so that the user does not have to provide any personally identifying information. In another example, the predefined template may be evaluated to identify second user information to request (e.g., a zip code, a message delivery address to which send content, etc.). User configuration of the message interface (e.g., a user profile provided by the user to the message provider) may be evaluated to identify a value associated with the second user information (e.g., a home zip code of the user's residence, the user message address, etc.). A second field may be created within the subscribe option. The second field may be prefilled with the value so that the user does not have to manually input the value but can delete or modify the value if the user so chooses.

At 410, responsive to the user accepting the subscribe option (e.g., with a single interaction used to select/invoke the subscribe action interface), creation of the user subscription to the content from the content provider may be facilitated without transitioning the user away from the message interface (e.g., the message interface may remain in a foreground state; the user is not transitioned to a landing page of the content provider; etc.). In an example, user privacy may be improved by sending a placeholder identifier, mapped to the user message address, to the content provider in place of sending the user message address to the content provider. Thus, the content provider is not provided with access to an actual user message address, such as an email address, of the user. Accordingly, the message provider may act as an intermediary for delivering content messages of the content to the user. For example, a content message, specifying the placeholder identifier as a recipient for the content message, may be received from the content provider. A mapping of the placeholder identifier to the user message address may be used to determine that the user message address is mapped to the placeholder identifier. In this way, the content message may be delivered to the user using the user message address.

In an example where the message provider acts as an intermediary between the user and content providers, a subscription interface may be provided to the user through the message interface. The subscription interface may be populated with a list of user subscriptions of the user with content providers. In this way, the user may modify, add, and/or revoke user subscriptions through the subscription interface, such as by changing a delivery method from one email address to a different email address, removing a gender designation, implementing a user subscription cancellation instruction, etc.

Figure 5A:
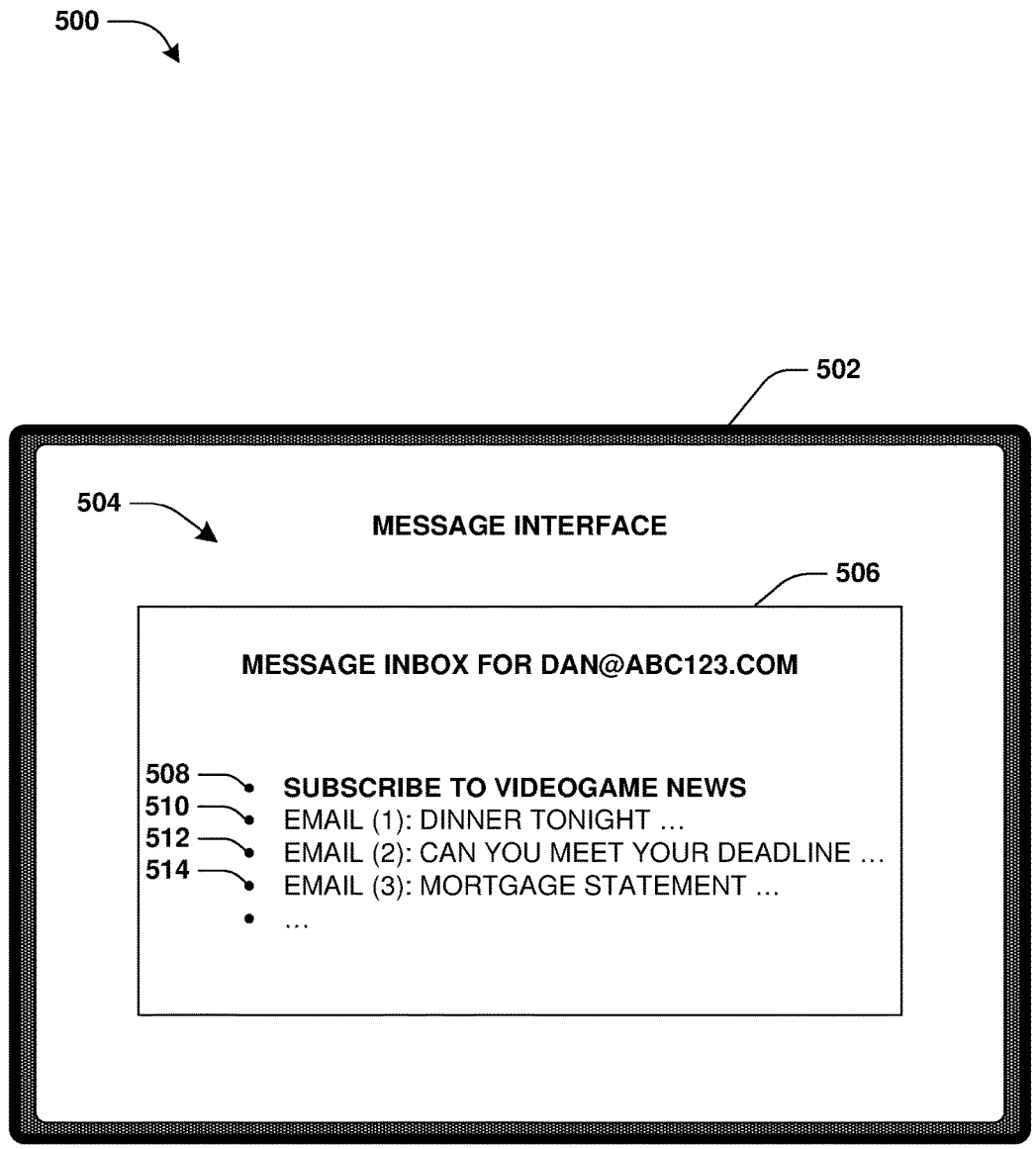
FIG. 5A is a component block diagram illustrating an example system for facilitating subscription to content from a content provider, where a content recommendation is provided through a message inbox.
Figure 5B:
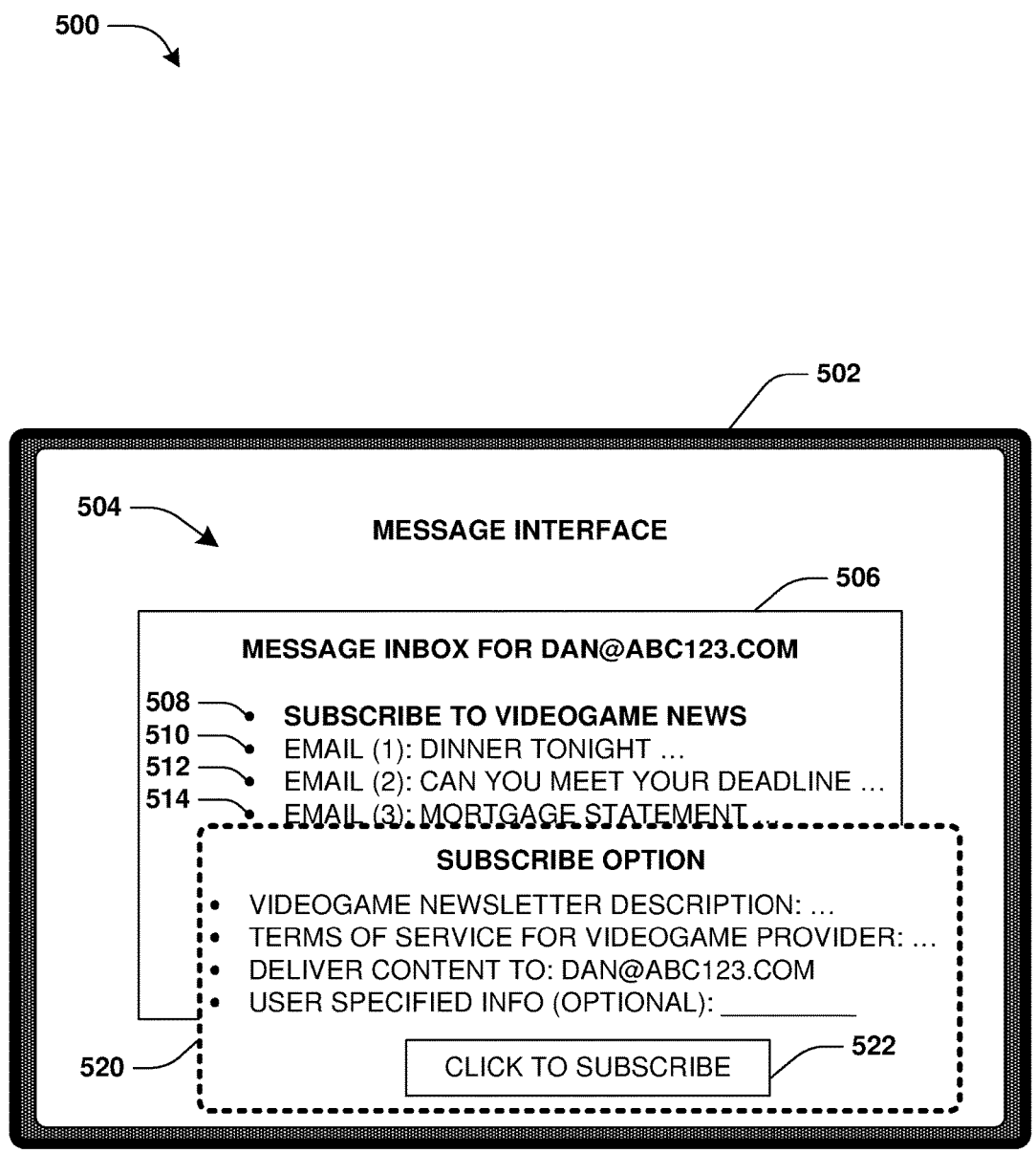
FIG. 5B is a component block diagram illustrating an example system for facilitating subscription to content from a content provider, where a subscribe option is provided through a message interface.

FIGS. 5A-5B illustrate examples of a system 500 for facilitating subscription to content from a content provider. FIG. 5A illustrates a user accessing a message interface 504 through a client device 502. The message interface 504 may provide the user with access to messages associated with a user message address of the user. For example, the message interface 504 may provide access to a message inbox 506 for messages associated with a dan@abc123.com user message address. The message inbox 506 may comprise one or more message slots into which messages are inserted. For example, a first email 510 regarding dinner tonight, a second email 512 regarding meeting deadlines, a third email 514 regarding a mortgage statement, and/or other messages may be displayed through the message slots of the message inbox 506.

In an example, a content recommendation 508 may be generated. The content recommendation 508 may recommend that the user create a user subscription to videogame newsletters from a videogame news provider. The content recommendation 508 may be based upon various information about the user, such as social network data indicating that the user has joined a videogame social network club, a user profile specifying an interest in videogames, the user receiving videogame emails, etc. The content recommendation 508 may be inserted into a message slot of the message inbox 506, such that the content recommendation 508 appears to be an email even though the content recommendation 508 is not an email (e.g., the content recommendation 508 may be functionality or a user interface element such as a button used to access a subscribe option having functionality through which the user can create the user subscription to the videogame newsletters without transitioning away from the message interface 504).

FIG. 5B illustrates the user interacting with the content recommendation 508 (e.g., clicking or touch gesturing the user interface element such as the button). Responsive to the user interacting with the content recommendation 508, a subscribe option 520 may be displayed within the message interface 504, such as through a pop-up window. The subscribe option 520 may comprise a videogame newsletter description, a terms of service for the videogame news provider, a prefilled field with the dan@abc123.com user message address, and/or any other information (e.g., a field into which the user may specify information such as an age or videogame genre preference). The subscribe option 520 may comprise a subscribe action interface element 522 (e.g., a button) that may be selected by the user to create the user subscription with the videogame news provider. For example, the dan@abc123.com user message address may be provided to the videogame news provider for creating the user subscription so that the videogame news provider can send messages, such as emails, comprising videogame newsletters to the user. In an example, the user may merely select the subscribe action interface element 522 without any other input or user action in order to create the user subscription (e.g., a one click subscribe action can be implemented because the field for inputting the user specified information may merely be optional).

Figure 6A:
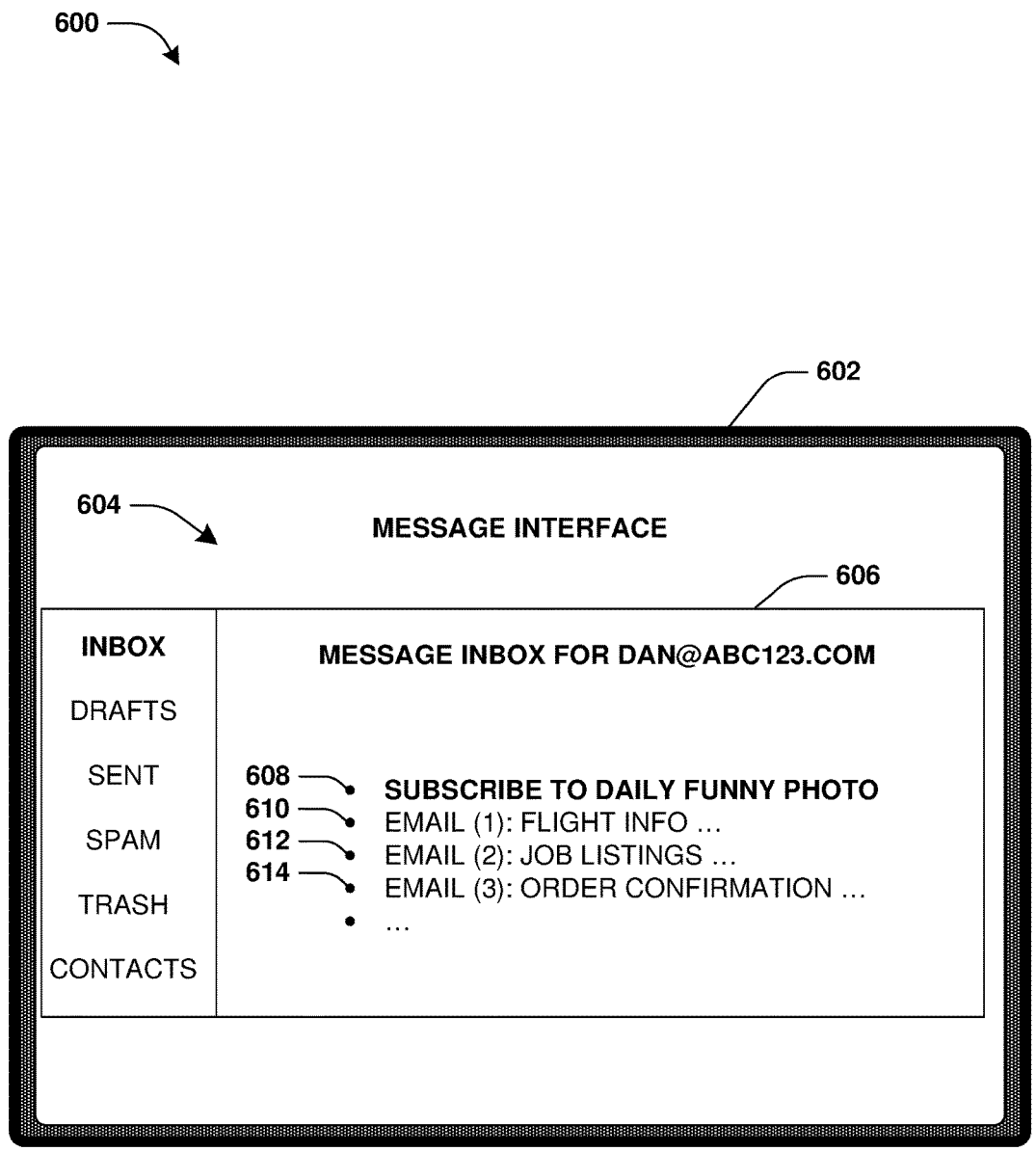
FIG. 6A is a component block diagram illustrating an example system for facilitating subscription to content from a content provider, where a content recommendation is provided through a message inbox.

FIGS. 6A-6D illustrate examples of a system 600 for facilitating subscription to content from a content provider. FIG. 6A illustrates a user accessing a message interface 604 through a client device 602. The message interface 604 may provide the user with access to messages associated with a user message address of the user. For example, the message interface 604 may provide access to a message inbox 606 for messages associated with a dan@abc123.com user message address. The message inbox 606 may comprise one or more message slots into which messages are inserted. For example, a first email 610 regarding flight information, a second email 612 regarding job listings, a third email 614 regarding an order confirmation, and/or other messages may be displayed through the message slots of the message inbox 606.

In an example, a content recommendation 608 may be generated. The content recommendation 608 may recommend that the user create a user subscription to daily funny photos from a photo provider. The content recommendation 608 may be based upon various information about the user, such as a browser history indicating that the user frequently visits photo websites and joke websites. The content recommendation 608 may be inserted into a message slot of the message inbox 606, such that the content recommendation 608 appears to be an email even though the content recommendation 608 is not an email (e.g., the content recommendation 608 may be functionality or a user interface element such as a button used to access a subscribe option having functionality through which the user can create the user subscription to the daily funny photos without transitioning away from the message interface 604).

Figure 6B:
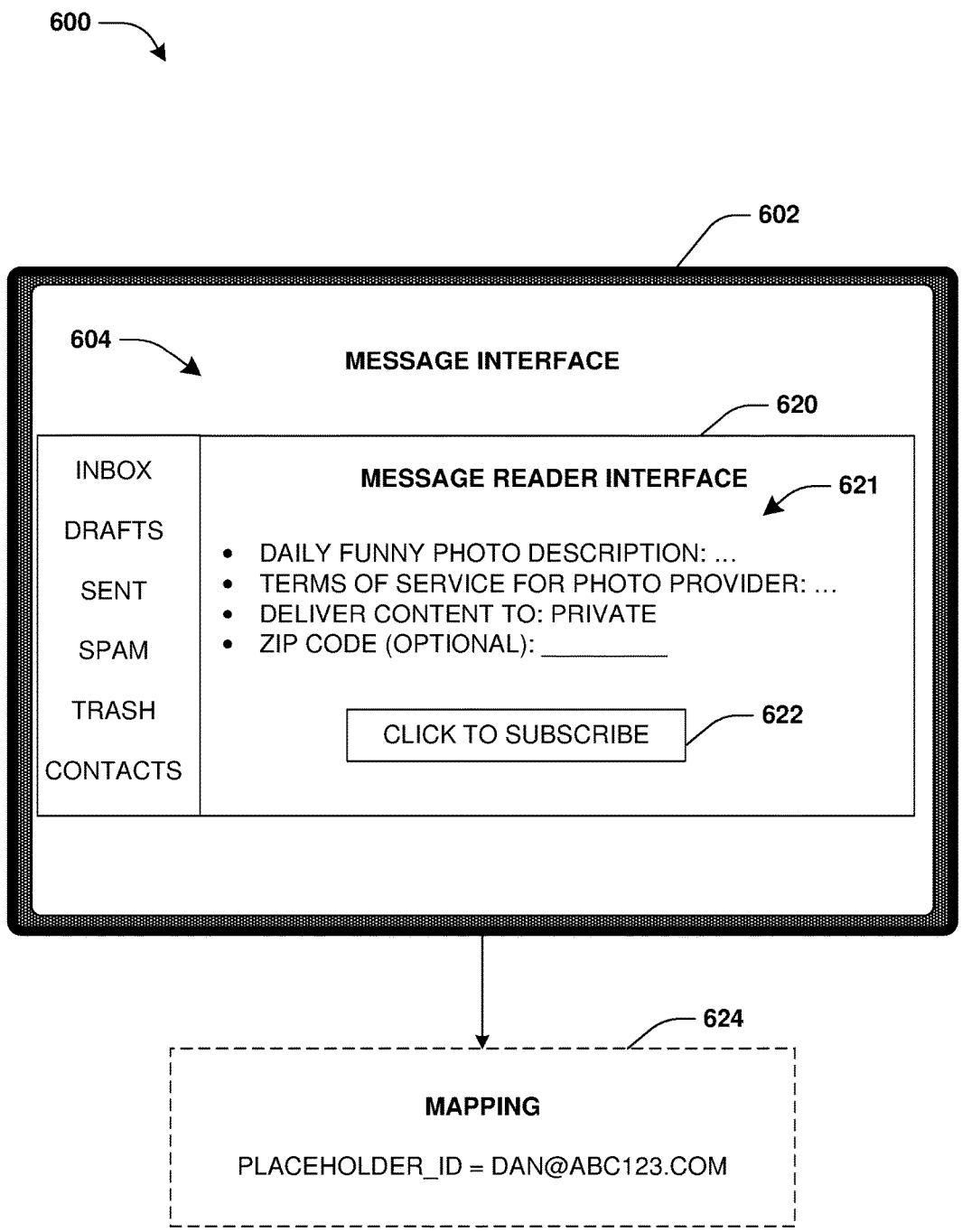
FIG. 6B is a component block diagram illustrating an example system for facilitating subscription to content from a content provider, where a mapping is maintained and a subscribe option is provided through a message reader interface.

FIG. 6B illustrates the user interacting with the content recommendation 608 (e.g., clicking or touch gesturing the user interface element such as the button). Responsive to the user interacting with the content recommendation 608, the message interface 604 may be transitioned from displaying the message inbox 606 to displaying a message reader interface 620 generally used to display emails in a readable format through the message interface (e.g., the ability to view a message body of an email, reply to the email, forward the email, delete the email, etc.). A subscribe option 621 may be displayed within the message reader interface 620 even though the subscribe option 621 is not an email, but it may otherwise appear as an email. The subscribe option 621 may comprise a daily funny photo description, a terms of service for the photo provider, a prefilled field indicating that the user's dan@abc123.com user message address will not be shared with the photo provider and that a placeholder identifier will be provided instead, and/or any other information (e.g., an optional field into which the user may specify a zip code). The subscribe option 621 may comprise a subscribe action interface element 622 (e.g., a button) that may be selected by the user to create the user subscription with the photo provider. For example, a mapping 624 may be created, such as by a message provider of the message interface 604, that maps the placeholder identifier with the dan@abc123.com user message address. Accordingly, the placeholder identifier, but not the dan@abc123.com user message address, may be provided to the photo provider for creating the user subscription, which improves user security and privacy. If the user provides the zip code, then the zip code may also be provided to the photo provider for creating the user subscription.

Figure 6C:
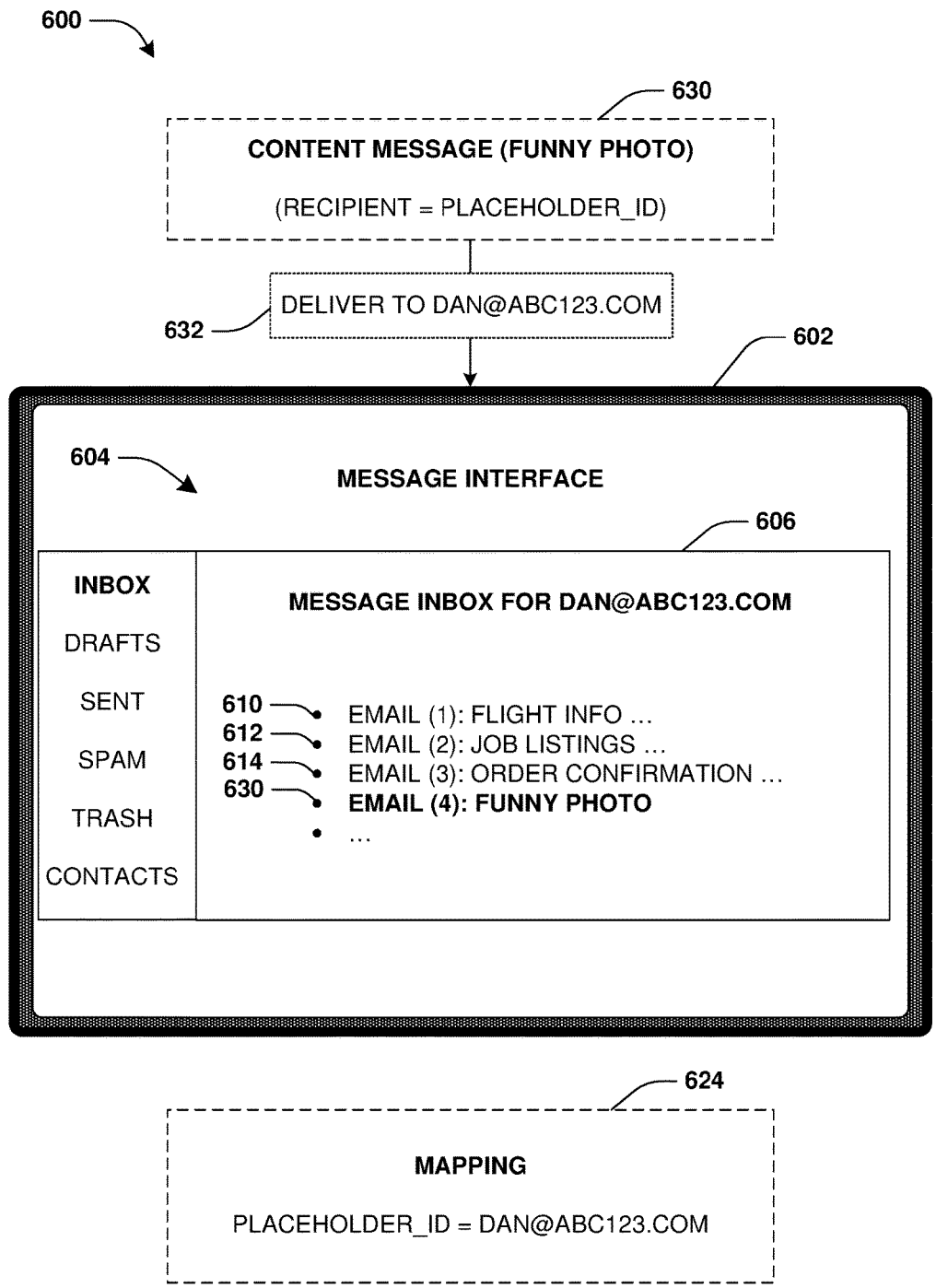
FIG. 6C is a component block diagram illustrating an example system for facilitating subscription to content from a content provider, where a content message is delivered to a user.

FIG. 6C illustrates the message provider acting as an intermediary between the user and the photo content provider. For example, the message provider may receive a content message 630 of a funny photo from the photo content provider. The content message 630 may designate the placeholder identifier as the recipient because the photo content provider does not know the user's actual user message address. The message provider may query a mapping repository to identify the mapping 624 that maps the placeholder identifier to the dan@abc123.com user message address. Accordingly, the message provider may deliver 632 the content message 630 to the message inbox 606 (e.g., as a fourth email) based upon the mapping 624.

Figure 6D:
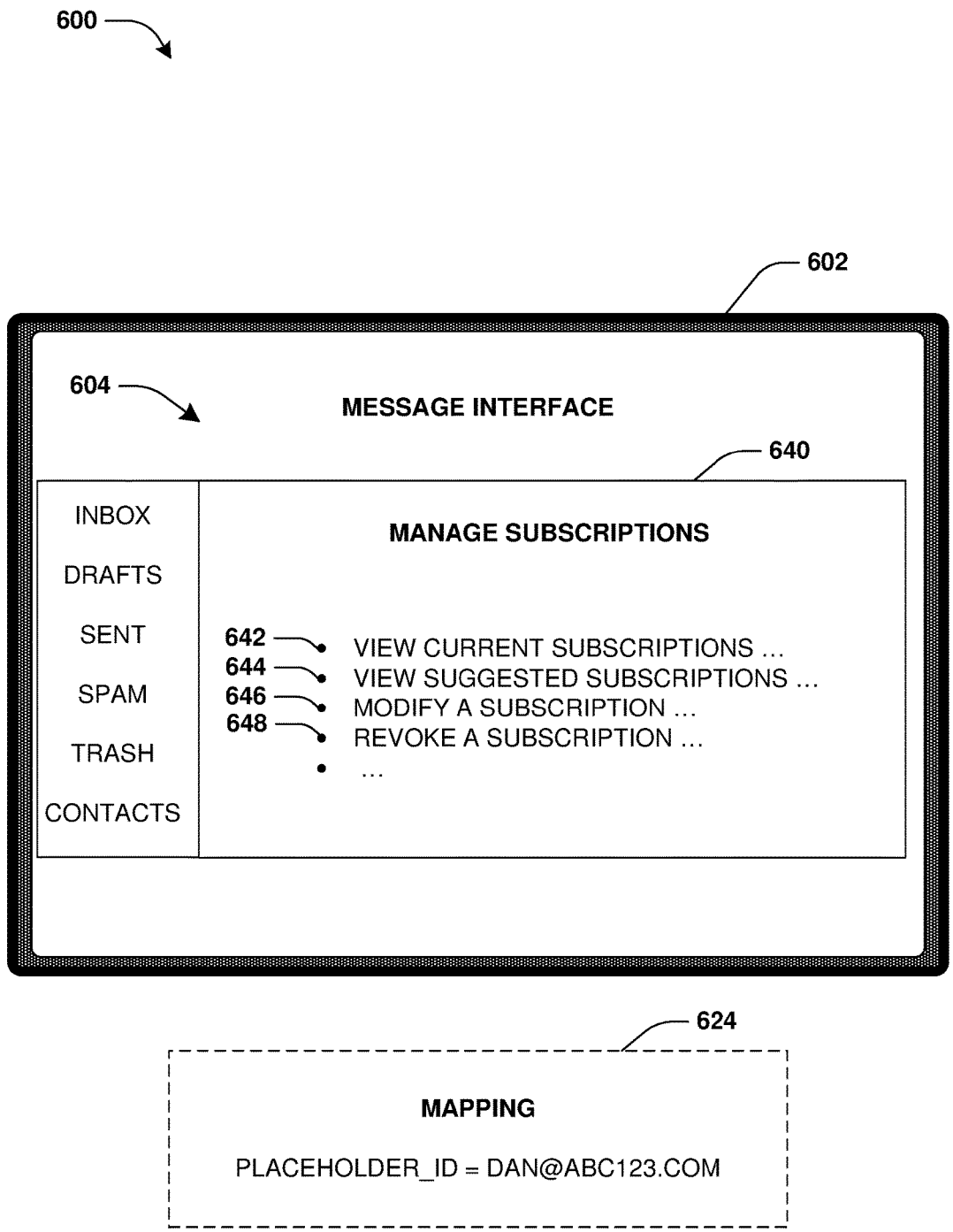
FIG. 6D is a component block diagram illustrating an example system for facilitating subscription to content from a content provider, where a subscriptions interface is provided through a message interface.

FIG. 6D illustrates the message interface 604 providing the user with access to a subscriptions interface 640. The user may utilize a view current subscriptions option 642 within the subscriptions interface 640 to view user subscriptions to which the user has subscribed. The user may utilize a view suggested subscriptions option 644 within the subscriptions interface 640 to view available user subscriptions (e.g., user subscriptions to content that may be deemed relevant and/or interesting to the user based upon content corresponding to user preferences, browsing history, and/or other user information and signals). The user may utilize a modify subscriptions option 646 within the subscriptions interface 640 to change details about a user subscription such as to change a delivery address for content, remove an age designation, etc. The user may utilize a revoke subscriptions option 648 within the subscriptions interface 640 to revoke a user subscription such as by removing the mapping 624 so that content messages directed to the placeholder identifier are not routed to the dan@abc123.com user message address or by cancelling a particular user subscription with a particular content provider.

Figure 7A:
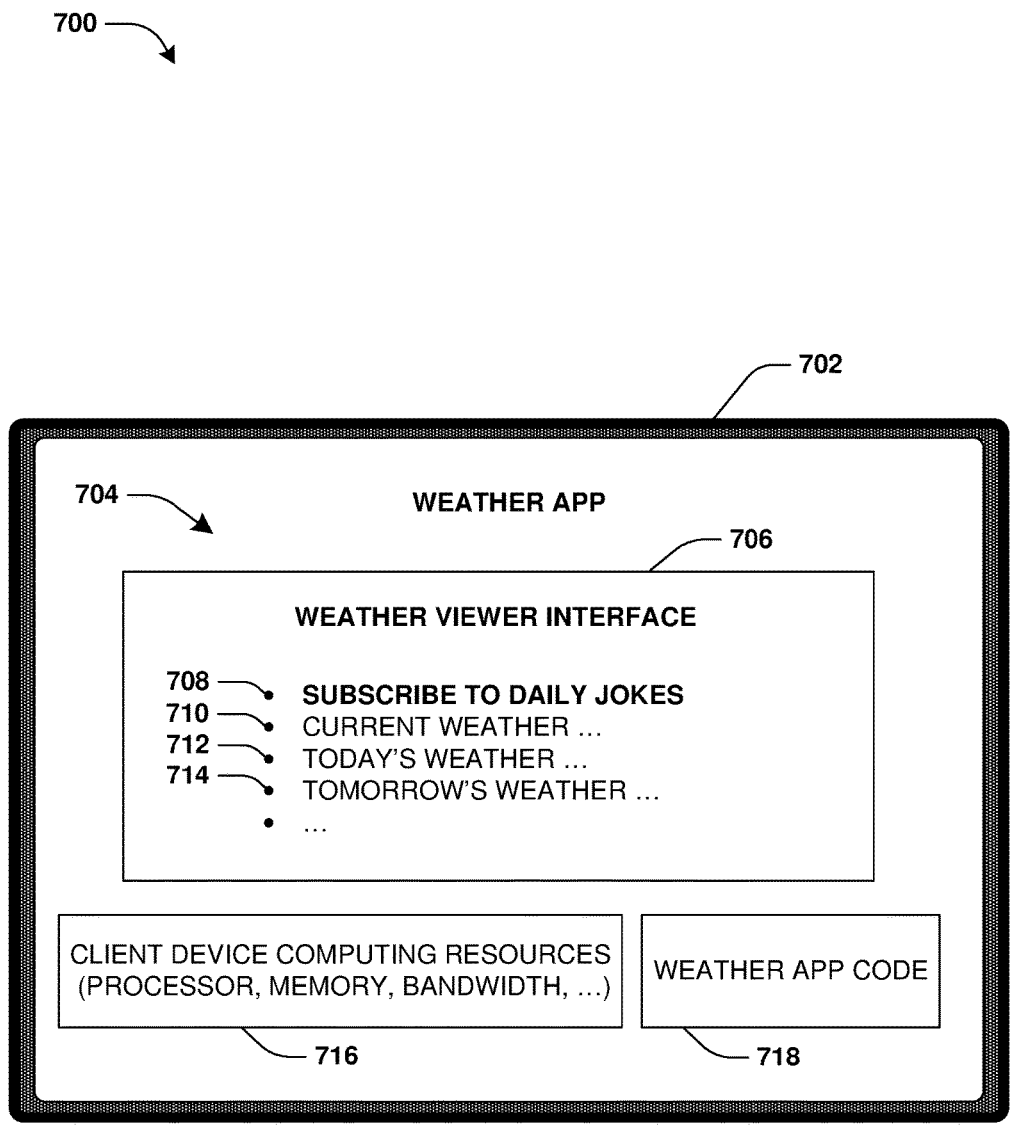
FIG. 7A is a component block diagram illustrating an example system for facilitating subscription to content from a content provider, where a content recommendation is provided through a weather viewer interface.
Figure 7B:
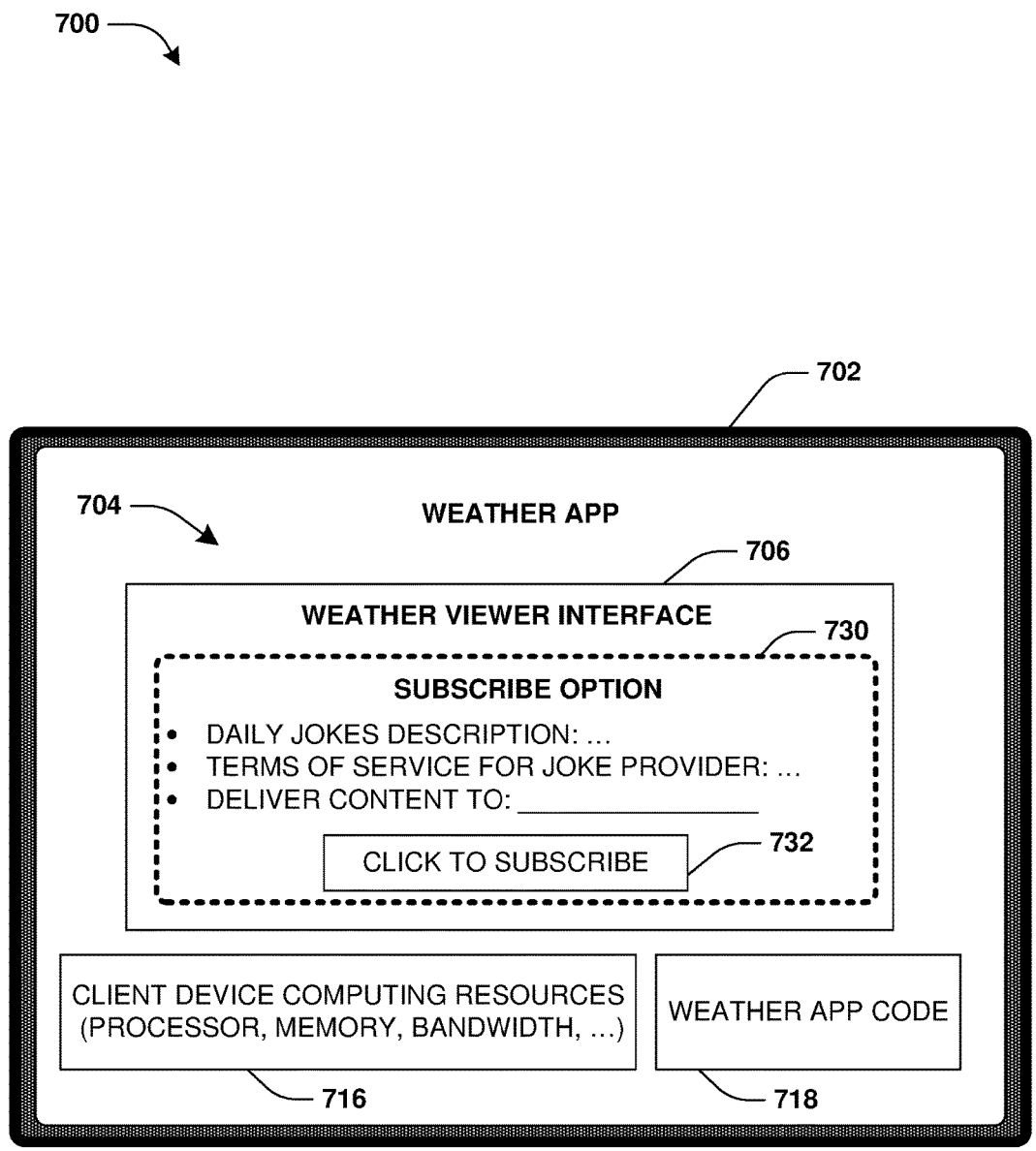
FIG. 7B is a component block diagram illustrating an example system for facilitating subscription to content from a content provider, where a subscribe option is provided through a weather viewer interface.

FIGS. 7A-7B illustrate a system 700 for facilitating subscription to content from a content provider. FIG. 7A illustrates a user accessing a weather app 704 through a client device 702. For example, the client device 702 may utilize client device computing resources 716, such as processor resources, memory resources, network bandwidth resources, etc., to execute weather app code 718 for hosting the weather app 704. The weather app 704 may display a weather viewer interface 706 through which the user can view current weather 710, today's weather 712, tomorrow's weather 714, etc.

In an example, a content recommendation 708 may be generated. The content recommendation 708 may recommend that the user create a user subscription to daily jokes from a joke provider. The content recommendation 708 may be based upon various information about the user, such as device check-ins at comedy clubs. The content recommendation 708 may be inserted into the weather viewer interface 706 even though the content recommendation 708 is not a weather viewing feature (e.g., the content recommendation 708 may be functionality or a user interface element such as a button used to access a subscribe option having functionality through which the user can create the user subscription to the daily jokes without transitioning away from the weather viewer interface 706).

FIG. 7B illustrates the user interacting with the content recommendation 708 (e.g., clicking or touch gesturing the user interface element such as the button). Responsive to the user interacting with the content recommendation 708, a subscribe option 730 may be displayed within the weather viewer interface 706. The subscribe option 730 may comprise a daily jokes description, a terms of service for the joke provider, a field into which the user may specify a delivery address (e.g., a physical home address, an email address, etc.), and/or any other information. The subscribe option 730 may comprise a subscribe action interface element 732 (e.g., a button) that may be selected by the user to create the user subscription with the joke provider without transitioning away from the weather viewer interface 706. In an example, the subscribe option 730 is created dynamically (e.g., on the fly) at the client device 702 utilizing the client device computing resources 716 and functionality within the weather app code 718, thus mitigating network bandwidth otherwise used to access a remote server to retrieve a predefined template for the joke provider for creating the subscribe option 730. In this way, the remote server can save bandwidth and storage resources by not storing hundreds of thousands of predefined templates for various content providers.

Figure 8A:
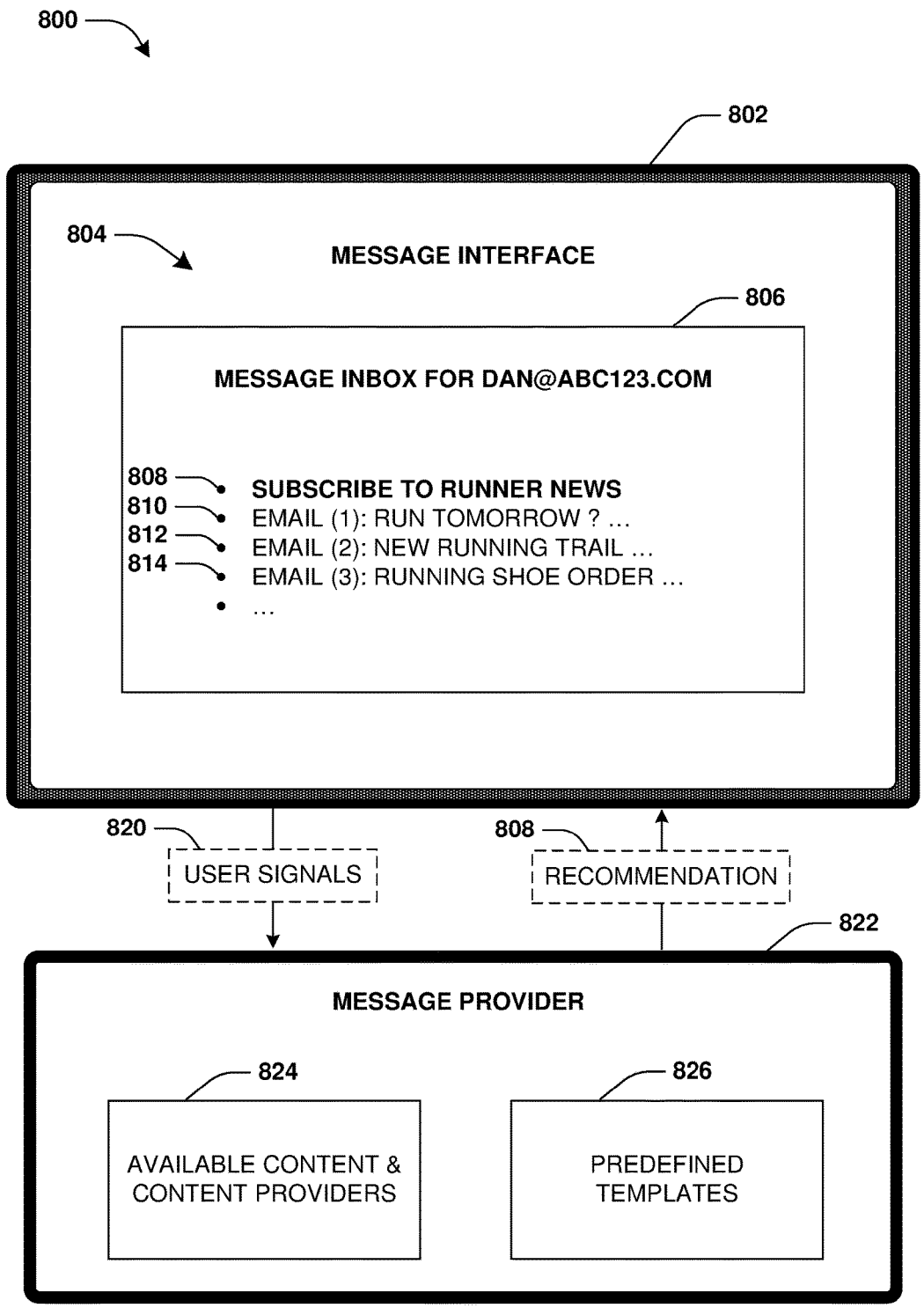
FIG. 8A is a component block diagram illustrating an example system for facilitating subscription to content from a content provider, where a content recommendation is provided through a message inbox.
Figure 8B:
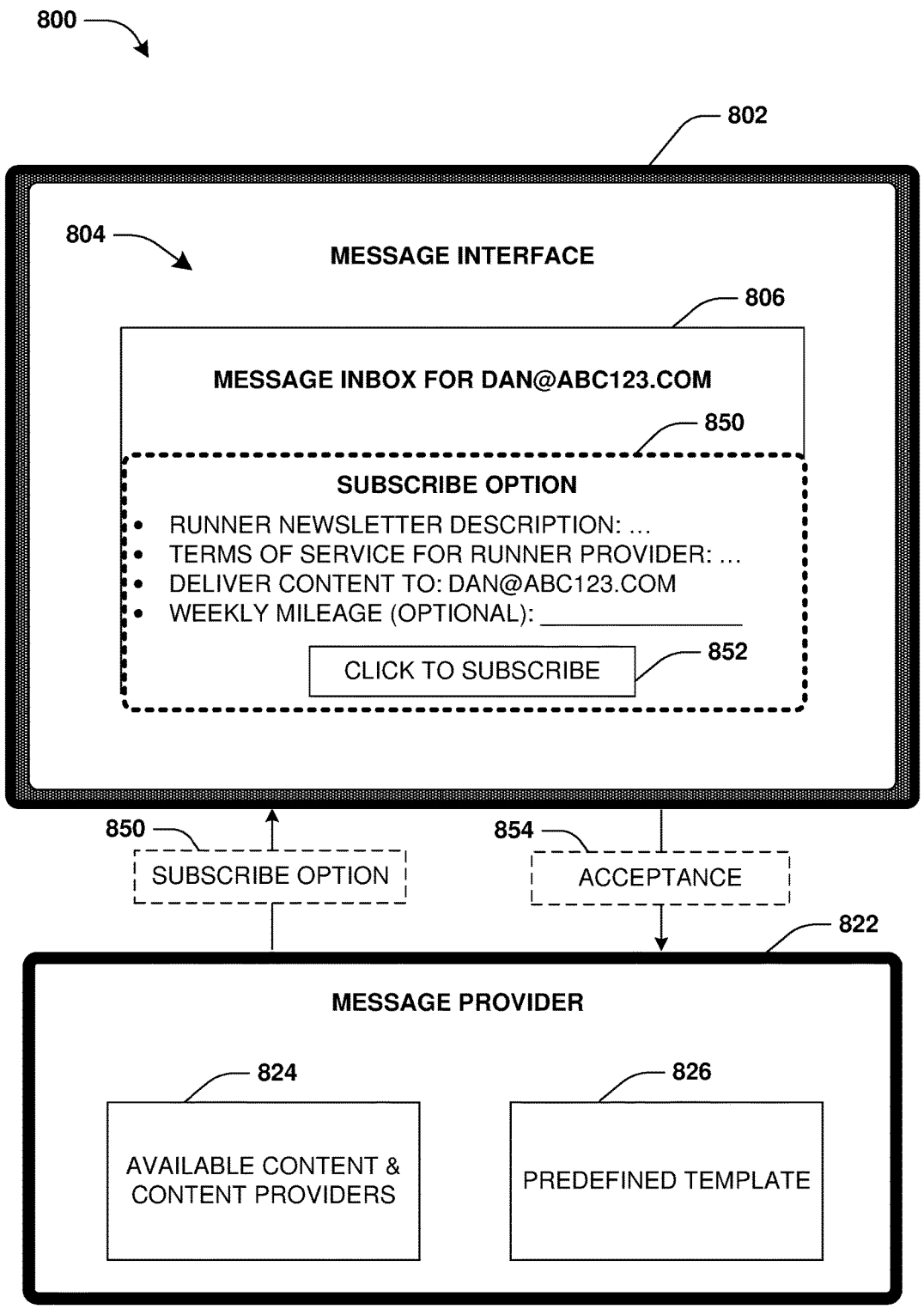
FIG. 8B is a component block diagram illustrating an example system for facilitating subscription to content from a content provider, where a subscribe option is provided through a message inbox.

FIGS. 8A-8B illustrate examples of a system 800 for facilitating subscription to content from a content provider. FIG. 8A illustrates a user accessing a message interface 804 through a client device 802. The message interface 804 may provide the user with access to messages associated with a user message address of the user. For example, the message interface 804 may provide access to a message inbox 806 for messages associated with a dan@abc123.com user message address. The message inbox 806 may comprise one or more message slots into which messages are inserted. For example, a first email 810 regarding running tomorrow, a second email 812 regarding a new running trail, a third email 814 regarding a running shoe order, and/or or messages may be displayed through the message slots of the message inbox 806.

In an example, a content recommendation 808 may be generated, such as by a message provider 822 that hosts the message interface 804 (e.g., an email provider or email server). The content recommendation 808 may recommend that the user create a user subscription to runner news from a runner provider. The content recommendation 808 may be based upon various information about the user, which may be derived from topics, keywords, entities, activities, and/or other features extracted from user signals 820, such as the emails within the message inbox 806, using text parsing, feature extraction, and/or content subject matter determination functionality that may be used to extract features and/or characterize content based upon text of the emails. In this way, a repository 824 of available content and content providers may be queried using features of the user signals 820 to identify the content and the content provider, such as the runner news and the runner provider, which may be relevant and/or interesting to the user. The content recommendation 808 may be inserted into a message slot of the message inbox 806, such that the content recommendation 808 appears to be an email even though the content recommendation 808 is not an email (e.g., the content recommendation 808 may be functionality or a user interface element such as a button used to access a subscribe option having functionality through which the user can create the user subscription to the runner news without transitioning away from the message interface 804).

FIG. 8B illustrates the user interacting with the content recommendation 808 (e.g., clicking or touch gesturing the user interface element such as the button). Responsive to the user interacting with the content recommendation 808, a subscribe option 850 may be displayed within the message interface 804, such as through a pop-up window. In an example, the message provider 822 may generate the subscribe option 850 based upon a predefined template 826 associated with the runner provider. For example, the predefined template 826 may specify a runner newsletter description, a terms of service for the runner provider, a request for a delivery address for the runner news, and an optional request for weekly running mileage of the user. In this way, the subscribe option 850 may be generated, provided to the client device 802, and displayed through the message interface 804. The request for a delivery address may be prefilled with the dan@abc123.com user message address. The subscribe option 850 may comprise a subscribe action interface element 852 (e.g., a button) that may be selected by the user to accept 854 the creation of the user subscription with the runner provider. For example, the dan@abc123.com user message address may be provided to the runner provider for creating the user subscription so that the runner provider can send messages, such as emails, comprising runner newsletters to the user. If the user specifies the optional weekly mileage, then the optional weekly mileage may be provided to the runner provider. In an example, the user may merely select the subscribe action interface element 852 without any other input or user action in order to create the user subscription (e.g., a one click subscribe action).

Figure 9:
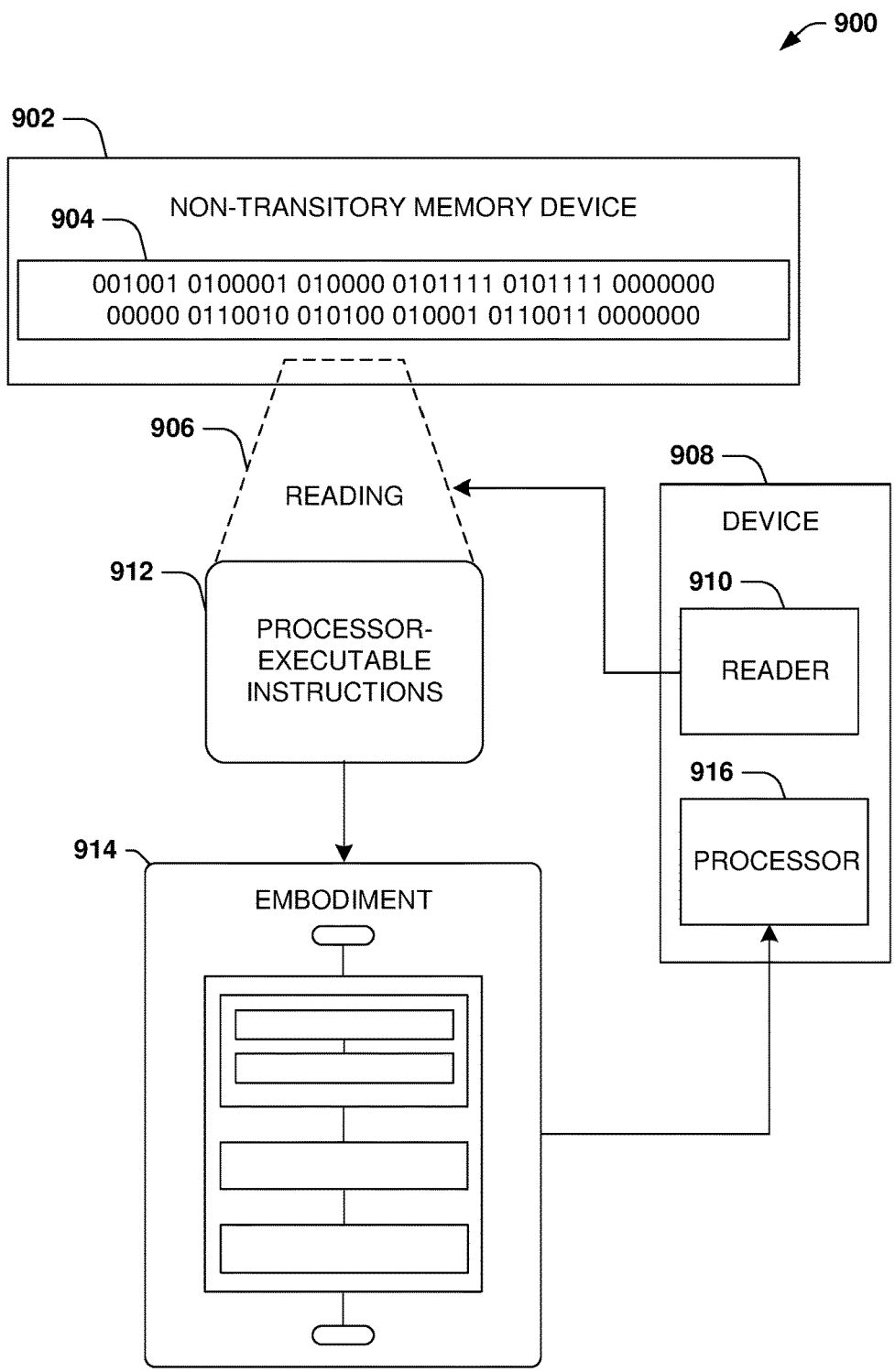
FIG. 9 is an illustration of a scenario featuring an example non-transitory machine readable medium in accordance with one or more of the provisions set forth herein.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein. The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed cause performance of operations, such as at least some of the example method 400 of FIG. 4, for example. In some embodiments, the processor-executable instructions 912 are configured to cause implementation of a system, such as at least some of the example system 500 of FIGS. 5A-5B, at least some of the example system 600 of FIGS. 6A-6D, at least some of the example system 700 of FIGS. 7A-7B, and/or at least some of the example system 800 of FIGS. 8A-8B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A non-transitory machine readable medium having stored thereon processor-executable instructions that when executed cause performance of operations, the operations comprising:
    displaying a message interface used to provide access to one or more messages associated with a user message address of a user, wherein the message interface comprises a plurality of message slots into which the one or more messages can be inserted;
    generating a content recommendation for subscribing to content of a content provider;
    inserting the content recommendation into a message slot of the plurality of message slots, the message slot associated with a display position rank that is greater than display position ranks associated with one or more messages slots of the plurality of message slots; and
    responsive to the user interacting with the content recommendation:
        displaying a subscribe option through a user interface; and
        responsive to the user accepting the subscribe option, facilitating creation of a user subscription to the content from the content provider;
    wherein at least one of:
    the facilitating creation of a user subscription comprises facilitating creation of the user subscription without transitioning the user away from the user interface; or
    the displaying a subscribe option comprises displaying the subscribe option within a pop-up window of the message interface.

2. The non-transitory machine readable medium of claim 1, wherein the facilitating creation of a user subscription comprises:
    facilitating creation of the user subscription without transitioning the user away from the user interface.

3. The non-transitory machine readable medium of claim 1, wherein the displaying a subscribe option comprises:
    utilizing client device resources of a client device hosting the message interface to generate the subscribe option dynamically using client side functionality of the message interface.

4. The non-transitory machine readable medium of claim 1, wherein the displaying a subscribe option comprises:
    displaying the subscribe option within the pop-up window of the message interface.

5. The non-transitory machine readable medium of claim 1, wherein the displaying a subscribe option comprises:
    populating the subscribe option with a content delivery option through which the user can specify a delivery method for the content.

6. The non-transitory machine readable medium of claim 1, wherein the operations comprise:
    populating first content from a first content provider in the user interface; and
    evaluating user signals of the user to identify a user interest of the user.

7. The non-transitory machine readable medium of claim 6, wherein the operations comprise:
    evaluating a set of content providers to identify a second content provider that provides second content corresponding to the user interest; and
    populating the user interface with a content recommendation for subscribing to the second content of the second content provider.

8. A method, comprising:
    displaying a message interface used to provide access to one or more messages associated with a user message address of a user, wherein the message interface comprises a plurality of message slots into which the one or more messages can be inserted;
    generating a content recommendation for subscribing to content of a content provider;
    inserting the content recommendation into a message slot of the plurality of message slots, the message slot associated with a display position rank that is greater than display position ranks associated with one or more messages slots of the plurality of message slots; and responsive to the user interacting with the content recommendation:

displaying a subscribe option through a user interface; and responsive to the user accepting the subscribe option, facilitating creation of a user subscription to the content from the content provider, wherein at least one of:

the facilitating creation of a user subscription comprises facilitating creation of the user subscription without transitioning the user away from the user interface; or the displaying a subscribe option comprises displaying the subscribe option within a pop-up window of the message interface.

9. The method of claim 8, wherein the facilitating creation of a user subscription comprises:

facilitating creation of the user subscription without transitioning the user away from the user interface.

10. The method of claim 8, wherein the displaying a subscribe option comprises:

utilizing client device resources of a client device hosting the message interface to generate the subscribe option dynamically using client side functionality of the message interface.

11. The method of claim 8, wherein the displaying a subscribe option comprises:

displaying the subscribe option within the pop-up window of the message interface.

12. The method of claim 8, wherein the displaying a subscribe option comprises:

populating the subscribe option with a content delivery option through which the user can specify a delivery method for the content.

13. The method of claim 8, comprising:

populating first content from a first content provider in the user interface; and evaluating user signals of the user to identify a user interest of the user.

14. The method of claim 13, comprising:

evaluating a set of content providers to identify a second content provider that provides second content corresponding to the user interest; and populating the user interface with a content recommendation for subscribing to the second content of the second content provider.

15. A computing device, comprising:

a processor; and memory comprising processor-executable instructions that when executed by the processor cause performance of operations, the operations comprising:

displaying a message interface used to provide access to one or more messages associated with a user message address of a user, wherein the message interface comprises a plurality of message slots into which the one or more messages can be inserted;

generating a content recommendation for subscribing to content of a content provider; inserting the content recommendation into a message slot of the plurality of message slots, the message slot associated with a display position rank that is greater than display position ranks associated with one or more messages slots of the plurality of message slots; and responsive to the user interacting with the content recommendation:

displaying a subscribe option through a user interface; and responsive to the user accepting the subscribe option, facilitating creation of a user subscription to the content from the content provider, wherein at least one of:

the facilitating creation of a user subscription comprises facilitating creation of the user subscription without transitioning the user away from the user interface; or the displaying a subscribe option comprises displaying the subscribe option within a pop-up window of the message interface.

16. The computing device of 15, wherein the facilitating creation of a user subscription comprises:

facilitating creation of the user subscription without transitioning the user away from the user interface.

17. The computing device of 15, wherein the displaying a subscribe option comprises:

utilizing client device resources of a client device hosting the message interface to generate the subscribe option dynamically using client side functionality of the message interface.

18. The computing device of 15, wherein the displaying a subscribe option comprises:

displaying the subscribe option within the pop-up window of the message interface.

19. The computing device of 15, wherein the displaying a subscribe option comprises:

populating the subscribe option with a content delivery option through which the user can specify a delivery method for the content.

20. The computing device of 15, wherein the operations comprise:

populating first content from a first content provider in the user interface;

evaluating user signals of the user to identify a user interest of the user;

evaluating a set of content providers to identify a second content provider that provides second content corresponding to the user interest; and populating the user interface with a content recommendation for subscribing to the second content of the second content provider.

* * * * *